April 20, 1954

A. MALGIERI, JR 2,675,671

GAS TURBINE APPARATUS WITH LUBRICATOR
AND FUEL VAPORIZATION

Filed Jan. 31, 1952

INVENTOR
Anthony Malgieri, Jr

BY
Ralph T. French
ATTORNEY

April 20, 1954 A. MALGIERI, JR 2,675,671
GAS TURBINE APPARATUS WITH LUBRICATOR
AND FUEL VAPORIZATION
Filed Jan. 31, 1952 2 Sheets-Sheet 2
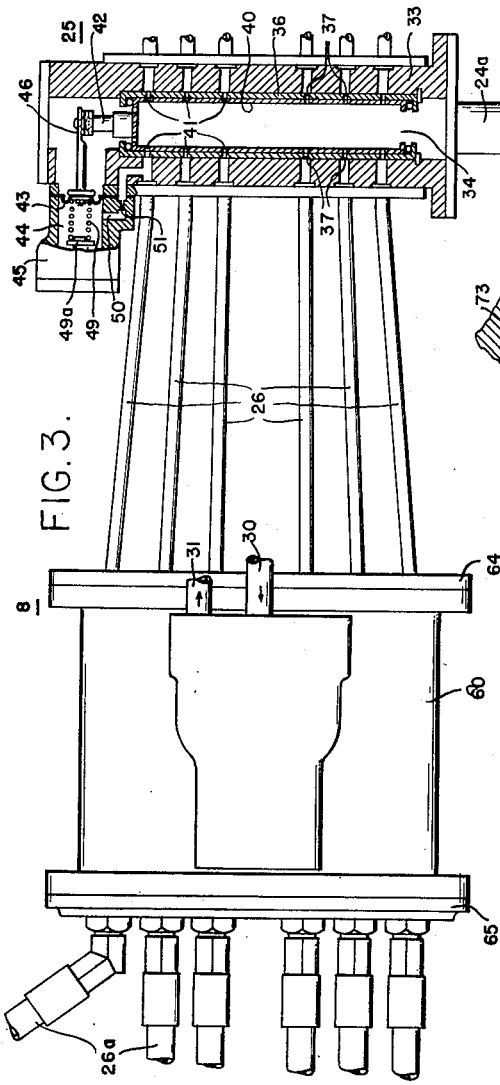
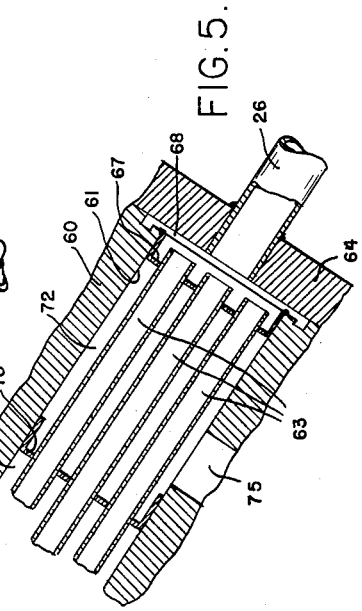
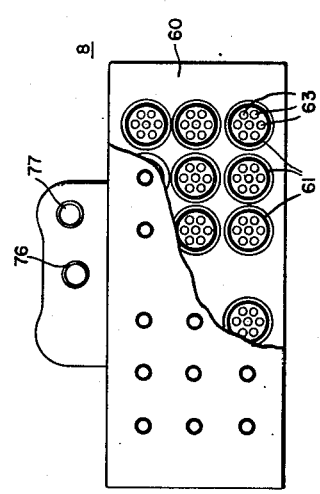
WITNESSES:
John M. Knight
V. W. Novak
INVENTOR
Anthony Malgieri, Jr
BY
Robert T. French
ATTORNEY Patented Apr. 20, 1954

2,675,671

UNITED STATES PATENT OFFICE 2,675,671

GAS TURBINE APPARATUS WITH LUBRICATOR AND FUEL VAPORIZATION

Anthony Malgieri, Jr., Swarthmore, Pa., assignor to Westinghouse Electric Corporation, East Pittsburgh, Pa., a corporation of Pennsylvania Application January 31, 1952, Serial No. 269,157

3 Claims. (Cl. 60—39.08)

1

This invention relates to aviation gas turbine power plants, more particularly to a fuel distribution and oil cooling system for a continuous combustion engine, and has for an object the provision of an improved oil cooler using fuel as a coolant medium.

Another object of the invention is the provision of improved fuel and oil system including an oil cooler which is disposed in a section of the fuel system where the fuel pressures are near a minimum, so that a leak-proof cooler assembly of relatively light construction may be employed.

It is a further object of the invention to provide an improved oil cooler adapted for association with a continuous combustion engine fuel system for a fuel vaporizing combustion chamber, the cooler being constructed and arranged to utilize to advantage any vaporization of fuel incident to operation of the engine at a low fuel consumption rate, thus promoting both reduction in oil temperatures and improvement in combustion chamber efficiency and stability.

It is also an object to provide fuel distribution and oil cooling apparatus in which critical rubber parts in the fuel system are so disposed as to avoid contact with fuel at the high cooler discharge temperatures encountered during altitude operation, so as to minimize possible malfunctioning of the fuel system incident to component deterioration.

Among features of the invention is the provision of heat exchange means having one set of passages connected to the engine oil system and another set of passages interconnected between a fuel distributor valve device of the fuel system and fuel vaporizing combustion apparatus of the engine. It has been demonstrated that when the engine is operated at minimum flight speed under high altitude conditions, the temperatures of both oil and fuel reach maximum values at their respective outlets in the heat exchange means. With the heat exchange means located in accordance with the invention, the relatively low pressure in the vaporizing combustion chamber, incident to operation at high altitude, becomes sufficiently low to allow some vaporization of fuel in the communications between the distributor valve and the heat exchange means, and in the fuel passages of heat exchange means. This fuel vaporization not only increases the proportion of heat rejected by the oil to the fuel by as much as 30% due to the favorable latent heat of vaporization characteristic, but results in still greater heat rejection by establishing favorable fuel Reynolds numbers

2 at the low fuel rate condition for improving the basic liquid-to-liquid heat transfer rate. Thus, the invention also has for an object the achievement of increased efficiency of the heat exchanger under service conditions which heretofore have tended to render more difficult the operation of oil cooling equipment of conventional non-vaporizing design.

These and other objects are effected by the invention as will be apparent from the following description and claims taken in connection with the accompanying drawings, forming a part of this application, in which:

Fig. 3 is a development plan view, taken substantially on line III—III of Fig. 2;

Fig. 4 is an end view of the same apparatus, partly broken away to illustrate the separate fuel and oil passages; and Fig. 5 is a fragmentary enlarged detail sectional view of a portion of the sectioned unit 60 of Fig. 2.

Figure 1:
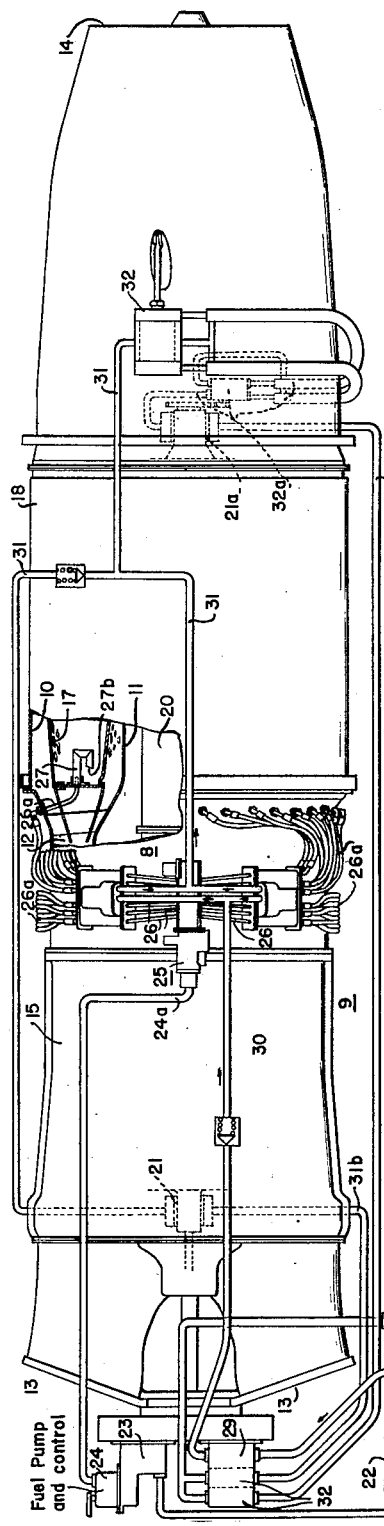
Fig. 1 is a schematic longitudinal view of an aviation gas turbine power plant equipped with oil and fuel systems and oil cooler apparatus constructed and arranged in accordance with the invention.

Referring to the drawings, a typical aviation gas turbine engine 9 is shown diagrammatically in Fig. 1, equipped with schematically illustrated fuel and oil systems, which are jointly connected to heat exchange apparatus or oil cooling apparatus 8, as hereinafter more fully described. The engine comprises a cylindrical outer casing structure 10 having mounted therein a sectional core structure 11, which with the outer casing structure defines an annular flow passageway 12 that extends longitudinally through the apparatus from a frontal air intake opening 13 to a rearwardly disposed discharge nozzle 14. The casing structure 10 is adapted to be mounted in or on the fuselage or wing of an aircraft (not shown), with the intake opening 13 pointed in the direction of flight. The axially aligned portions of the power plant include an axial-flow compressor portion 15, annular fuel combustion apparatus 17, and a turbine portion 18, the rotors of the turbine and compressor (not shown) being operatively connected together through the medium of a shaft 20, which may be suitably journaled in the casing structure on bearings indicated at 21 and 21a. In operation, air drawn into the intake opening 13 is compressed by the compressor and delivered to the combustion apparatus 17, to which fuel is supplied by way of apparatus hereinafter described. The resultant hot motive gas is then supplied from the combustion apparatus to the turbine, and is finally discharged through the nozzle 14 in the form of a jet establishing a propulsive thrust.

The fuel system may comprise a suitable reservoir 22 connected by way of an engine-driven fuel pump 23 and fuel control apparatus 24 to the inlet pipe 24a of a flow divider valve device 25, which in turn is provided with a plurality of discharge tubes 26, which communicate, by way of suitable passages in the oil cooling apparatus 8, hereinafter described, with a number of discharge tubes 26a and fuel vaporizing tubes 27 mounted in the combustion apparatus 17. The fuel control apparatus 24, not illustrated in detail, may be of any suitable construction adapted to effect metering of fuel to the engine at a desired rate under various operating conditions. By way of example, one type of fuel control apparatus suitable for this purpose is disclosed in the application of Cyrus F. Wood, Serial No. 121,171, filed October 13, 1949, and assigned to the assignee of the present invention.

In a typical power plant such as that illustrated, thirty-six vaporizing tubes 27 may be mounted in circumferentially spaced relation within the upstream end of the annular combustion apparatus 17. The vaporizing tubes have elbow bends, and terminate in outlet ends 27b which face in an upstream direction. The fuel discharge tubes 26a open into the inlet ends of the vaporizing tubes 27 with sufficient clearance to admit primary air to the latter from the annular passage 12 of the power plant. Such primary air is thus mixed with fuel supplied by way of the fuel discharge tubes 26a, and the mixture is preheated during passage through the vaporizing tubes 27, prior to introduction of the mixture into the combustion zone of the combustion apparatus 17.

The oil system of the engine is adapted to effect supply of oil under pressure both for lubricating bearings such as bearings 21 and 21a, and for motivating one or more auxiliary components, such as a variable area nozzle mechanism for the nozzle 14. The oil system may include an oil reservoir 28, an oil supply pump 29 having a discharge pipe 30 leading to suitable oil circulating passages in the heat exchange apparatus 8, hereinafter described, a cooled oil pipe 31 connected directly to the bearing 21 and through a nozzle actuator device 32 and suitable communications associated therewith and generally indicated at 32a, to the bearing 21a. From the bearing 21a, return pipes 31a and 31b lead to the suction inlets of suitable scavenging pumps 32. The actuator device 32 does not constitute a feature of the present invention, and consequently is not disclosed in detail.

As best shown in Fig. 3 of the drawings, the flow divider valve device 25 comprises a casing structure 33 having a fuel receiving chamber 34 which communicates through the pipe 24a with the discharge side of the fuel control apparatus 24 shown in Fig. 1. Mounted in one end of the chamber 34 is a cylindrical bushing 36 in which are formed a plurality of accurately ground and matched outlet ports 37 corresponding in number to the vaporizing tubes 27. For varying the flow areas of the ports 37 there is provided a sleeve valve member 40, which is rotatably mounted in the bushing 36 and has a plurality of similarly calibrated orifices 41 adapted to register with the respective ports 37. The sleeve valve member 40 has an axial shaft 42 which extends into the closed end of the chamber 34, where a diaphragm 43 is mounted between that chamber and a balancing chamber 44, formed in a casing section 45. The diaphragm 43 is operative to effect turning of the shaft 42 through the medium of suitable linkage 46. Movement of the linkage in both directions may be limited by suitable adjustable stop means (not shown) carried by the casing structure 33. A coil spring 49 is interposed between the diaphragm 43 and an adjustable abutment 49a, carried by a wall of the chamber 44, for biasing the diaphragm toward a normal position, which may be the position in which the flow areas of ports 37 will be a minimum.

Further in accordance with the invention, one of the fuel discharge tubes 26 communicates, at a point downstream of the corresponding port 37, with a passage 50 leading to the diaphragm chamber 44 and including a restricted flow portion or damping orifice 51. The damping orifice 51 is adapted to limit the effect of any pulsations in pressure that might be set up during operation of the fuel system.

It will now be understood that in any position of the rotary sleeve valve 40 of the distributing valve device 25, as determined by operation of the diaphragm 43 in accordance with the differential between the pressure of fuel in chamber 44 and the pressure of fuel supplied from the fuel control apparatus 24 to the chamber 34, the flow areas of all the registering calibrated ports 37 and 41 will be equal and will correspond to fuel demand. Rotation of the sleeve valve 40 is adapted to effect uniform variation in the flow areas of the calibrated ports and through this means the pressure drop across the respective ports can be accurately held to predetermined values over a wide fuel flow range. The pressure drop across the diaphragm 43 is substantially equal to the pressure drop across the registering ports 37 and 41. When the fuel pressure in chamber 34 is increased, it moves the diaphragm 43 outwardly, thereby effecting rotation of sleeve valve 40 to increase the orifice flow areas. Upon a reduction in fuel pressure in chamber 34 below the combined pressure of spring 49 and of the fuel in chamber 44, the sleeve valve 40 will be turned to reduce the flow areas of said ports 37 and 41.

Figure 2:
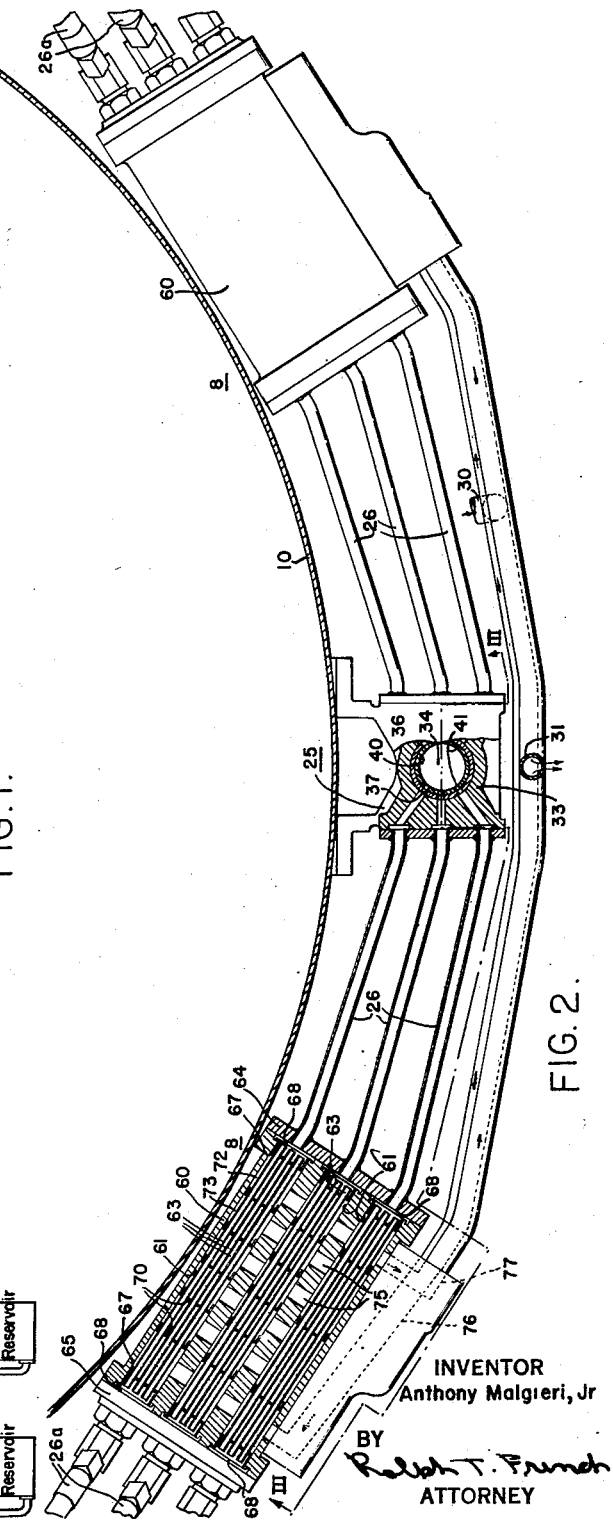
Fig. 2 is an enlarged detail, fragmentary side view, partly in section, of the fuel distributor and oil cooler apparatus shown in Fig. 1.

According to the invention, the heat exchanger or oil cooler apparatus 8 comprises a pair of identical cooler units 60, which are arranged on opposite sides of the fuel distributor valve device 25. Each of the cooler units 60 has formed therein longitudinally extending bores 61, corresponding in number to the fuel discharge tubes 26, and each containing a bundle of smaller tubes 63 having opposite open ends disposed adjacent end plates 64 and 65, respectively. As best shown in Fig. 5, the open ends of the tubes 63 extend in sealed relation through suitably apertured headers 67, which conform to the respective bores 61 and are snugly fitted in opposite ends thereof. Spaces 68 are thus defined between the headers 67 and the adjacent end plates 64 at inner ends of the units, as shown in Fig. 3, and likewise between the headers 67 and the end plates 65 of the units, respectively (see Fig. 2). Fuel flowing from the distributor valve device 25 is thus conducted by way of each of the discharge tubes 26, the connected space 68, the small tubes 63 and opposite space 68 to the conduits 26a for supply to the engine combustion chamber.

Baffles 70, similar to the headers 67, are provided for dividing each of the bores 61 into compartments, such as those indicated at 72 and 73. A plurality of transversely disposed passages, such as those indicated by the reference character 75, are formed in each of the units 60 for connecting the compartments thus formed between the baffles 70 into a network constituting a continuous tortuous oil flow path (not illustrated in its entirety), through which oil can be circulated in heat exchange relation with the bundles of tubes 63, from an oil inlet 76 to an oil outlet 77. The inlets 76 of both units 60 communicate with the pipe 30, while the outlets 77 communicate with the pipe 31 of the engine oil system.

A heat balance analysis of the engine fuel and oil systems has shown that the fuel reaches its peak temperature at the cooler outlet or discharge tubes 26a associated with the heat exchange apparatus 8, when the engine is operating at the maximum altitude, minimum flight speed condition. This is true because of the high fuel system pumping losses at this flight condition due to the large percentage of fuel being bypassed, and the large temperature rise through the heat exchange apparatus 8 as a result of the low fuel flow. The heat exchange apparatus described in this application is located between the fuel distributor valve and the vaporizing tubes 27 in the combustion chamber, so that fuel at this peak temperature does not come into contact with any critical rubber parts, such as the usual O rings and diaphragms in fuel system components, which might deteriorate in contact with hot fuel.

A heat balance analysis of the engine fuel and oil systems also shows that oil temperatures are a maximum at the discharge side of the heat exchange apparatus 8 during high altitude, minimum ram engine operation. This is true not only because the oil system heat load is greatest at this condition, but further because the capacity of the fuel system to accept heat from the oil at this condition is low, due to the low fuel flow and the high fuel temperature at the inlet side of the heat exchange apparatus. When located between the engine fuel distributor valve and the vaporizing combustion chamber as taught by the invention, the heat exchange apparatus 8 is interposed in a section of the fuel system which is essentially at combustion chamber pressure. During high altitude operation this pressure is sufficiently low to allow vaporization of the fuel in the lines or tubes 26 between the fuel distributor valve device 25 and the heat exchange apparatus 8, and in the latter as well. The vaporization of fuel as thus effected may increase the amount of heat rejected by the oil to the fuel by as much as 30%, due to the improvement in latent heat of vaporization characteristics. Greater heat rejection from the oil to the fuel is further promoted due to improvement of the basic liquid-to-liquid heat transfer effect at this low fuel rate condition incident to the more favorable fuel Reynolds numbers. It is important to note that this increased cooling efficiency of the heat exchange apparatus herein described is made available under conditions which are normally conducive to low cooling efficiency in conventional equipment. Under such conditions, this increased cooling efficiency renders feasible the maintenance of lower oil temperatures and higher fuel discharge temperatures than would be attainable in a cooler of non-vaporizing design. Economies in engine oil consumption, and increased oil system reliability resulting from lower oil temperatures, as well as the advantages incident to operation of the combustion apparatus with pre-vaporized fuel during altitude operation, are thus among the benefits contributed by the invention.

While the invention has been shown in but one form, it will be obvious to those skilled in the art that it is not so limited, but is susceptible of various changes and modifications without departing from the spirit thereof.

What is claimed is:

1. In an aircraft jet propulsion power plant equipped with an oil circulating system for supplying lubricating and component motivating oil under pressure to the power plant, and a fuel system for metering fuel under pressure at a variable rate to an outlet for distribution to a plurality of fuel vaporizing elements in a combustion chamber of the power plant, in combination, a fuel flow divider device having a fuel inlet connected to the outlet of the fuel system and a plurality of like calibrated discharge orifices, and heat exchange means interposed between said flow divider device and said fuel vaporizing elements, said heat exchange means having a plurality of individual fuel passages connected to said orifices and to said vaporizing elements, respectively, and a plurality of oil passages adjacent said fuel passages and having oil inlet and outlet openings connected to said oil circulating system, whereby heat from oil passing through said oil passages is transferred to fuel in said fuel passages for cooling the oil while facilitating vaporization of fuel supplied to said vaporizing elements in the combustion chamber.

2. In an aircraft jet propulsion power plant equipped with an oil circulating system for supplying lubricating and component motivating oil under pressure to the power plant, and a fuel system for metering fuel under pressure at a variable rate to an outlet for distribution to a plurality of fuel vaporizing elements in a combustion chamber of the power plant, in combination, a fuel flow divider device having a fuel inlet connected to the outlet of the fuel system and a plurality of like calibrated discharge orifices, and heat exchange means, said heat exchange means having a plurality of individual fuel passages and separate oil passages arranged in enveloping relation thereto, means connecting said oil passages into said oil circulating system, means connecting said fuel passages, respectively, to said orifices of the distributor valve and to said fuel vaporizing elements of the combustion chamber, said fuel passages and the associated connecting means being always open to said combustion chamber and subject to combustion chamber pressure which is sufficiently low during high altitude and minimum flight speed conditions to effect vaporization of fuel in said passages for thereby increasing efficiency of said heat exchange means.

3. In an aircraft jet propulsion power plant; an oil circulating system including an oil pump and oil lines for supplying lubricating and component motivating oil under pressure to the power plant; combustion apparatus including a plurality of fuel vaporizing tubes; a fuel system for metering fuel under pressure at a variable rate to said fuel vaporizing tubes in the combustion chamber, said fuel system including a source of fuel, pump and control means connected thereto and having a discharge communication, and a fuel distributor valve device having an inlet connected to said discharge communication and a plurality of calibrated discharge orifices corresponding in number of said fuel vaporizing tubes; a fuel vaporizing oil cooler apparatus interposed between the discharge orifices of said distributor valve device and said vaporizer tubes, said oil cooler apparatus comprising a pair of similar units disposed on opposite sides of said distributor valve device, each of the units having one half as many individual fuel passages as said distributor valve device has discharge orifices, and separate oil passages enveloping said fuel passages in heat exchanging relation and having a common inlet and a common outlet; conduit means connecting the calibrated discharge orifices to said fuel passages, respectively, other conduit means connecting each of said fuel passages to a corresponding vaporizing tube in said combustion apparatus, means connecting the oil passage inlet of each of said units to said oil pump, and means connecting the oil passage outlet thereof to said oil lines.

References Cited in the file of this patent

UNITED STATES PATENTS

| Number | Name | Date |
|---|---|---|
| 1,999,237 | Hobbs | Apr. 30, 1935 |

FOREIGN PATENTS

| Number | Country | Date |
|---|---|---|
| 627,386 | Great Britain | Aug. 8, 1949 |